US006296696B1

(12) United States Patent
Létourneau et al.

(10) Patent No.: US 6,296,696 B1
(45) Date of Patent: Oct. 2, 2001

(54) ONE-PASS METHOD FOR PREPARING PAPER SIZE EMULSIONS

(75) Inventors: Michel D. Létourneau, Boucherville (CA); Walter Maliczyszyn, Somerville, NJ (US)

(73) Assignee: National Starch & Chemical Investment Holding Corporation, Wilmington, DE (US)

( * ) Notice: Subject to any disclaimer, the term of this patent is extended or adjusted under 35 U.S.C. 154(b) by 0 days.

(21) Appl. No.: 09/212,068

(22) Filed: Dec. 15, 1998

(51) Int. Cl.[7] .............................. C09D 7/14; B01F 15/02; D21H 1/38

(52) U.S. Cl. .................................... 106/287.2; 106/150.3; 106/174.1; 106/205.1; 106/209.1; 162/164.1; 162/174; 162/175; 162/177; 162/178; 366/176.1; 366/182.2; 366/262; 524/112

(58) Field of Search .............................. 106/287.2, 150.3, 106/174.1, 205.1, 209.1; 162/164.1, 174, 175, 177, 178; 366/176.1, 182.2, 262; 524/112

(56) References Cited

U.S. PATENT DOCUMENTS

| | | | |
|---|---|---|---|
| 4,115,332 | 9/1978 | Young et al. | 260/17.4 |
| 4,243,480 | 1/1981 | Hernandez et al. | 162/141 |
| 4,272,297 | 6/1981 | Brooks et al. | 106/306 |
| 4,756,801 | 7/1988 | Jokinen et al. | 162/175 |
| 4,872,951 | 10/1989 | Maliczyszyn et al. | 162/135 |
| 5,061,346 | 10/1991 | Taggart et al. | 162/175 |
| 5,104,487 | 4/1992 | Taggart et al. | 162/168.3 |
| 5,122,231 | 6/1992 | Anderson | 162/175 |
| 5,302,249 | 4/1994 | Malhotra et al. | 162/135 |
| 5,308,441 | 5/1994 | Kern | 162/158 |
| 5,397,436 | 3/1995 | Robeson et al. | 162/158 |
| 5,500,087 | 3/1996 | Bernard et al. | 162/164.6 |
| 5,624,186 | 4/1997 | Ogier | 366/176.1 |
| 5,723,023 | 3/1998 | Tsai et al. | 162/175 |

*Primary Examiner*—David Brunsman
(74) *Attorney, Agent, or Firm*—Laurelee A. Duncan; Eugene Zagarella

(57) ABSTRACT

A one-pass, non-tolerance dependent method for preparing paper size emulsions comprising an aqueous emulsion of a substituted cyclic dicarboxylic anhydride, a colloidal stabilizer, and a surfactant wherein the emulsion after one-pass through a dispersion system has an average particle size of less than 2 microns.

16 Claims, 5 Drawing Sheets

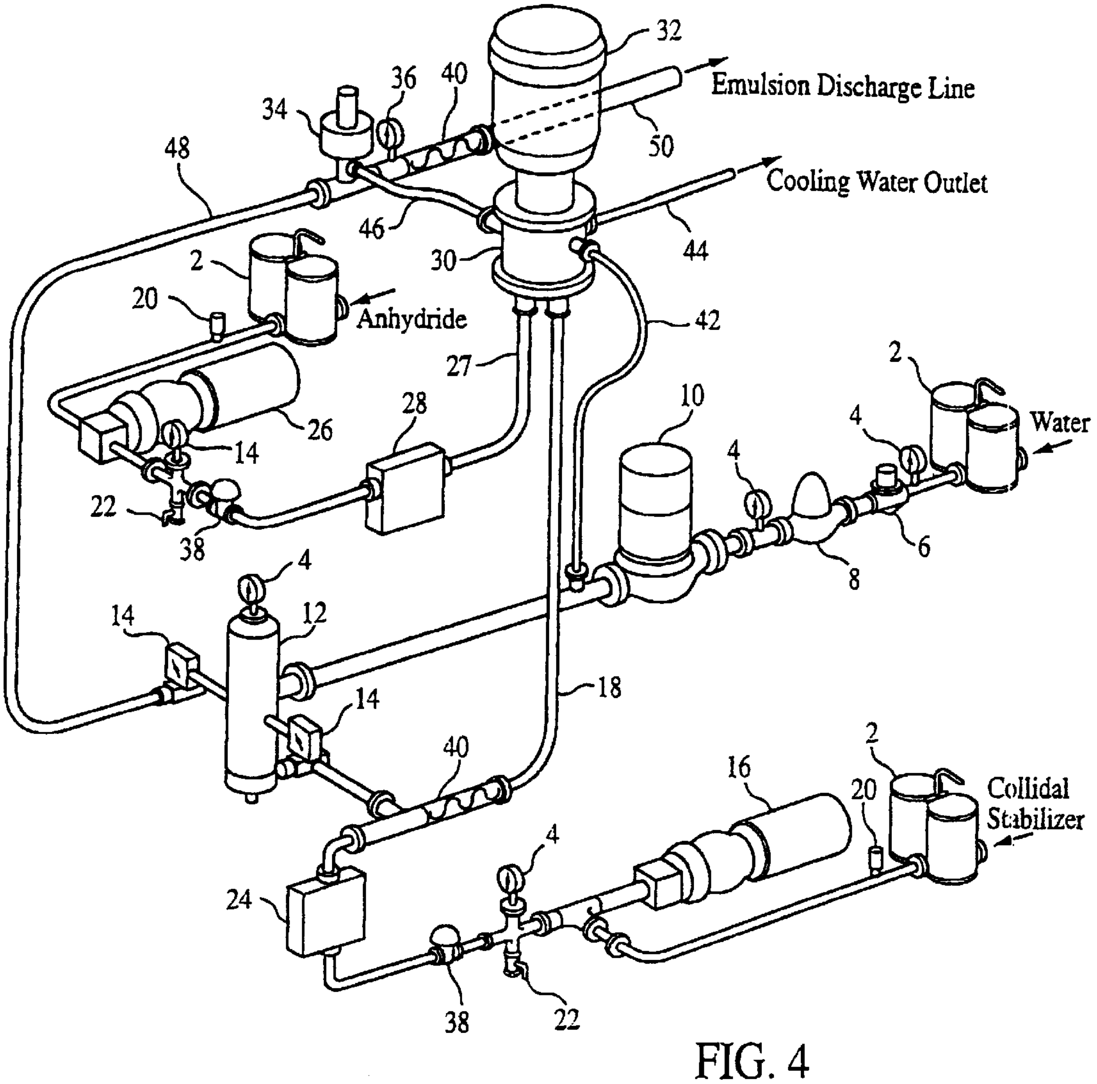

FIG. 4

LEGEND

2 - Duplex Strainer
4 - Pressure Gauge
6 - Solenoid Valve
8 - Water Regulator
10 - Water Booster Pump
12 - Surge Cylinder
14 - Micrometric Valve
16 - Collidal Stabilizer Pump
18 - Collidal Stabilizer Feed Line
20 - Vent Valve
22 - Drain Valve
24 - Mag Flow Meter
26 - Anhydride Pump
27 - Anhydride Feed Line
28 - Mass Flow Meter
30 - Emulsifying Chamber
32 - Electric Motor
34 - Homogenizing Valve
36 - Temperature Gauge
38 - Pressure Relief Valve
40 - Static Mixer
42 - Cooling Water Line
44 - Cooling Water Drain Line
46 - Exit Line
48 - Water Line
50 - Emulsion Discharge Line

ONE-PASS METHOD FOR PREPARING PAPER SIZE EMULSIONS

FIELD OF THE INVENTION

This invention relates to a one-pass method through a non-tolerance dependent dispersion system for preparing paper size emulsions. More particularly, the paper size emulsions comprise an aqueous emulsion of a substituted cyclic dicarboxylic anhydride, a colloidal stabilizer, and a surfactant wherein the emulsion after one-pass through a dispersion system has an average particle size of less than 2 microns.

BACKGROUND OF THE INVENTION

Paper and paperboard are often sized with various hydrophobic compounds including, for example, wax emulsions, ketene dimers, isocyanate derivatives, fatty acid complexes, fluorocarbons, certain styrene-maleic anhydride copolymers, and substituted cyclic dicarboxylic acid anhydrides such as alkenyl succinic anhydride (ASA). These compounds are referred to as sizes or sizing compounds and may be introduced during the actual paper making operation wherein the process is known as internal sizing. Sizing compounds may also be applied to the surface of the finished web or sheet in which case the process is known as external or surface sizing.

In the case of ASA size, in order to have effective sizing agents with ability for uniform size dispersion throughout the fiber slurry it must be emulsified into a fine particle size emulsion. Typically such emulsions are prepared with the aid of ionically modified starches, carboxymethyl cellulose, natural gums, gelatin, synthetic polymers, or polyvinyl alcohol, all of which act as colloidal stabilizers. In commercial practice, ASA is emulsified with these materials with or without surfactant. The desired particle size for a good quality emulsion is a majority of the particles having a particle size of less than 2 microns. Emulsions having an average particle size of greater than 2 microns negatively affects the retention mechanism and creates deposits of undesired hydrolysates throughout the papermaking process. This adds to the product quality problems and necessitates disassembly and cleaning of the papermaking equipment.

Most presently used emulsification systems are designed on high homogenizing shear and/or pressure, and high tolerance between the stationary and rotating blades, with a flow recirculation loop. In these systems, emulsion prior to attaining its workable property must pass through the turbine emulsification apparatus multiple times, generally in excess of nineteen passes. This high shear, heat generating process has a negative impact on the quality of the final product. It also adds to the cost and complexity of the equipment since extra controls and additional equipment/space is required for the process.

Therefore, it would be advantageous to prepare a paper size emulsion having an average particle size of less than 2 microns through one-pass, non-tolerance dependent dispersion system.

SUMMARY OF THE INVENTION

Accordingly, it is an object of the present invention to provide a method for preparing paper size emulsions.

It is another object of the invention to provide a method for preparing paper size emulsions having an average particle size of less than 2 microns.

It is also an object of the invention to minimize the number of passes through a dispersion system which are required to reduce the average particle size of a paper size emulsion to less than 2 microns.

It is a further object of the invention to provide a dispersion system which effectively emulsifies immiscible materials and is economical.

With regard to the foregoing and other objects, the present invention provides a one-pass method through a non-tolerance dependent dispersion system for preparing a paper size emulsion wherein the emulsion after one-pass through a dispersion system has an average particle size of less than 2 microns, said method comprising:

(I) preparing raw materials which comprise at least one substituted cyclic dicarboxylic anhydride, at least one colloidal stabilizer, and water;

(II) adding the raw materials prepared in Step (I) to a dispersion system comprising:

- a housing having a bottom chamber and an upper chamber wherein said housing has a means for cooling in contact therewith;
- a motor mounted to said housing for turning a shaft extending into said housing;
- a baffle plate mounted to said housing to separate said upper chamber from said lower chamber, said baffle plate having an aperture for receiving said shaft therethrough and forming an annular passage therebetween;
- at least two kinetic baffles mounted within said lower chamber to form pressure zones;
- an inlet cap mounted to said housing and having a primary inlet and a secondary inlet for delivering said plurality of materials into said lower chamber; and,
- at least two blades mounted to said shaft, at least one of said blades disposed in said lower chamber and at least one of said blades disposed in said upper chamber; and (III) emulsifying the raw materials in the dispersion system at a temperature of from about 40° F. to about 160° F. to form a paper size emulsion.

According to a preferred embodiment of the invention, the emulsion after one-pass through the dispersion system has an average particle size of about 1 micron.

One-pass through the dispersion system of the invention is sufficient to form an emulsion having an average particle size of less than 2 microns, preferably about 1 micron. More preferably, at least 95%, most preferably at least 98%, of the emulsion particles after one-pass through the dispersion system have a particle size of less than 2 microns.

Paper size emulsions prepared using the one-pass, non-tolerance dependent method of the invention which are added in the papermaking process provide paper with liquid resistance. Moreover, the one-pass, non-tolerance dependent method for preparing the paper size emulsion eliminates the need for repeated passes through the dispersion system in order to achieve an emulsion having the required small particle size which is a cost advantage to paper manufacturers. In addition, the dispersion system of the invention is more cost effective to manufacture due to the nontolerant equipment specifications and the lack of recirculation. Furthermore, the novel dispersion system of the invention operates at lower temperatures and pressures than prior art emulsification equipment which allows for longer equipment life. Such lower operating temperatures also provide a paper size emulsion product with improved stability which adds to the efficiency of the sizing.

BRIEF DESCRIPTION OF THE DRAWINGS

The above and other features of the invention will be further described in the following detailed specification in conjunction with the accompanying drawings in which:

FIG. 4 is a isometric view of a dispersion system in accordance with the invention.

DESCRIPTION OF THE INVENTION

Figure 1:
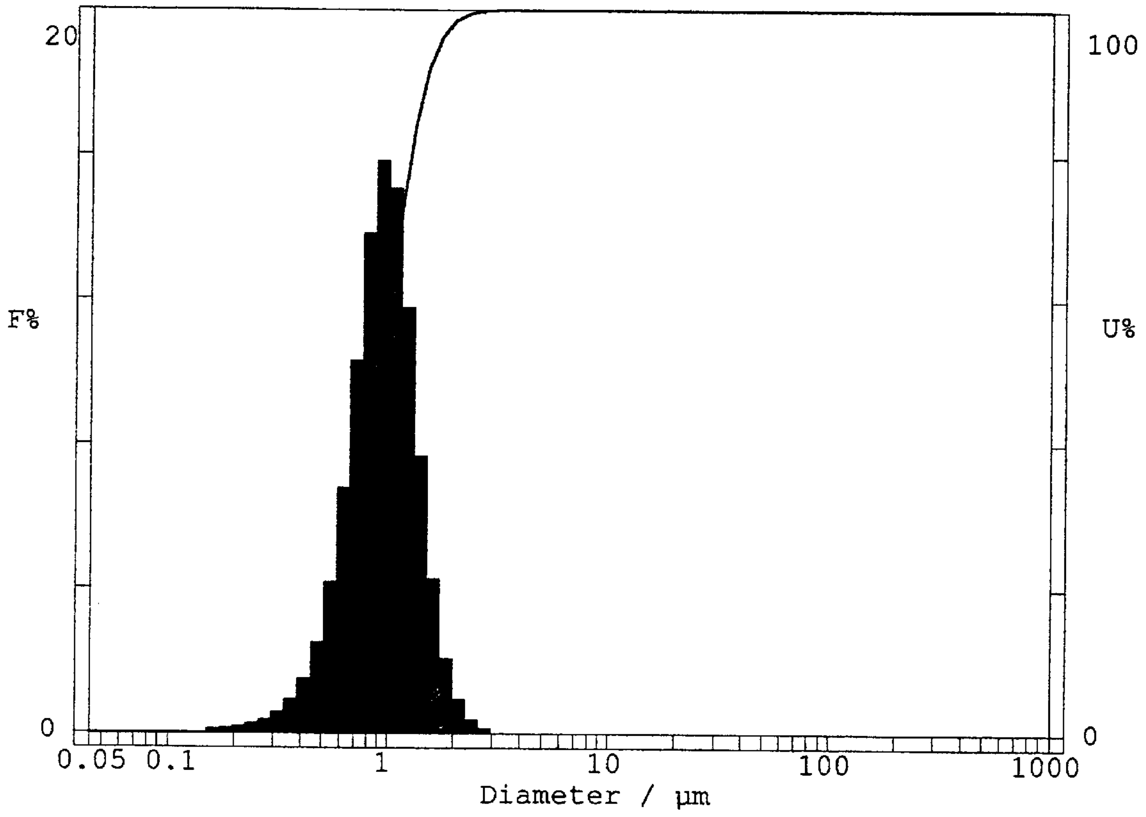
FIG. 1 is a graph of a particle size distribution of an alkenyl succinic anhydride/starch paper size emulsion after one-pass through a dispersion system in accordance with the invention.

This invention provides a novel one-pass, non-tolerance dependent method for preparing paper size emulsions. As used herein, the term "non-tolerance dependent" means that the gap between the stationary blade(s) and rotating blade(s) is not critical and thus a wide spacing is acceptable. It is noted that in turbine systems, the stationary and rotating blades are necessarily spaced as close as possible (1/10 mm) to create the maximum shear necessary for a small particle size emulsion. Such small tolerances are very tight and subject to misalignment which leads to wear and tear and deleteriously effects the quality of the emulsion and requires vigilant maintenance to readjust the tolerances and replace blades. In contrast to prior art systems, the dispersion apparatus of this invention provides enough shear due to the overall design without requiring the stationary and rotating blades to be close together.

In Step (I), raw materials are prepared which comprise at least one substituted cyclic dicarboxylic anhydride and at least one colloidal stabilizer, and water. Optionally, a surfactant is included as a raw material. The water may be mixed with one or more of the raw materials or added separately. As used herein, "raw materials" or "raw material" means chemical components modified or unmodified which are used to prepare the emulsion of the invention. Preferably a surfactant is combined with the substituted dicarboxylic anhydride.

The substituted cyclic dicarboxylic acid anhydrides have the following structures:

(i)

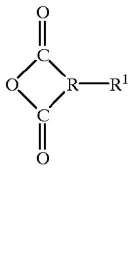

-continued (ii)

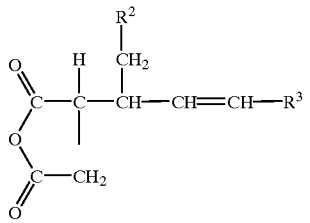

(iii)

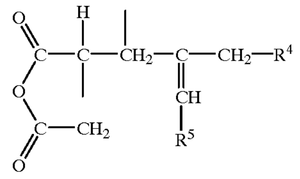

wherein R is a dimethylene or trimethylene radical; $R^1$ is a alkyl, alkenyl, aralkyl, or aralkenyl group having 6 to 23 carbon atoms, preferably 13 to 21 carbon atoms; $R^2$ and $R^3$ are independently an alkyl radical having 4 to 23 carbon atoms; and $R^4$ and $R^5$ are independently an alkyl radical having 5 to 23 carbon atoms.

Specific examples of substituted cyclic dicarboxylic acid anhydrides within Structure (i) include iso-octadecenyl succinic acid anhydride, n- or iso-hexadecenyl succinic acid anhydride, dodecenyl succinic acid anhydride, dodecyl succinic acid anhydride, decenyl succinic acid anhydride, octenyl succinic acid anhyd ride, and triisobutenyl succinic acid an hydride. The substituted cyclic dicarboxylic acid anhydrides of structure (i) are described in U.S. Pat. No. 3,102,064 which is hereby incorporated herein by reference.

Specific examples of substituted cyclic dicarboxylic acid anhydrides within Structure (ii) include (1-octyl-2-decenyl)-succinic acid anhydride and (1-hexyl-2-octenyl)-succinic acid anhydride. The substituted cyclic dicarboxylic acid anhydrides of structure (ii) are described in U.S. Pat. No. 3,821,069 which is hereby incorporated herein by reference.

Specific examples of substituted cyclic dicarboxylic acid anhydrides within structure (iii) include non-polymeric sizes prepared by the reaction of maleic acid anhydride with vinylidene olefins such as 2-n-hexyl-1-octene, 2-n-octyl-1-dodecene, 2-n-octyl-1-decene, 2-n-dodecyl-1-octene, 2-n-octyl-1-octene, 2-n-octyl-1-nonene, 2-n-hexyl-decene and 2-n-heptyl-1-octene. The substituted cyclic dicarboxylic acid anhydrides of structure (iii) are described in U.S. Pat. No. 3,968,005 which is hereby incorporated herein by reference.

The colloidal stabilizer is preferably selected from the group consisting of gelatinized or cold water soluble starches or modified starches, carboxymethyl cellulose, natural gums, gelatin, cationic polymers or polyvinyl alcohol. More preferably, the colloidal stabilizer is starch. The colloidal stabilizer is preferably added to the dispersion system in the form of mixture with water. For example, the colloidal stabilizer is generally present at an amount of from about 1 to about 50 weight percent based on the combined weight of the colloidal stabilizer and water, more preferably 5 to 15 weight percent.

Starches for use in the method of the invention must be gelatinized or cold water soluble. Particularly useful starches include corn, waxy maize, potato, tapioca and high amylose starch. The starch may be modified by cationic, anionic, nonionic, amphoteric, and/or zwitterionic substituent groups.

Examples of modified starches are starches that are modified by etherification with alkylene oxides, particularly the alkylene oxide modified corn, waxy maize, potato, and tapioca. Specific examples of modified starches include starches modified with 2-diethylaminoethyl chloride and starch modified with quaternary ammonium reagents such as 3-chloro-2-hydroxypropyltrimethyl-ammonium chloride; starches oxidized with hypochlorite; starches reacted with crosslinking agents such as phosphorus oxychloride, epichlorohydrin, and phosphate derivatives prepared by reaction with sodium or potassium orthophosphate or tripolyphosphate and combinations thereof. Combinations of two or more of the starches may be used to prepare the emulsions of the invention.

Suitable cationic polymers which may be used as a colloidal stabilizer in the mixture of the invention include water soluble vinyl addition homopolymers and copolymers preferably having a molecular weights greater than 10,000 and less than 1,000,000. More preferably the cationic polymers have a molecular weight of from 20,000 to 500,000. Specific examples of cationic polymers include acrylamide-dimethylaminoethylacrylate, acrylamide-dimethylaminoethylacrylate quaternaries, acrylamide-diethylaminoethylacrylate, acrylamide-diethylaminoethylacrylate quaternaries, acrylamide-dimethylaminoethylmethacrylate, acrylamide-dimethylaminoethylmethacrylate quaternaries, acrylamide-diallyldimethyl ammonium chloride, polydiallyl-dimethyl ammonium chloride, polydimethylaminoethylmethacrylate and its quaternaries, polymethacrylamidopropyltrimethyl ammonium chloride; and acrylamide-methacrytlamidopropyltrimethyl ammonium chloride.

Also useful are polymers and copolymers of acrylamide which have been subjected to a "Mannich" reaction with formaldehyde and a lower alkyl secondary amine. These cationic polymers may or may not be quaternized.

Surfactants which are optionally used to form the mixture of the invention include polyoxyalkylene alkyl or polyoxyalkylene alkyl-aryl ethers or corresponding mono- or di-esters useful herein comprise polyoxyethylene or polyoxypropylene alkyl and alkyl-aryl ethers or esters containing 5 to 20 polyoxyethylene or polyoxypropylene units wherein the alkyl radical contains from 8 to 20 carbon atoms and the aryl radical contains from 6 to 12 carbon atoms, preferably phenyl. The specific ethers or mono- or di-esters used in the present invention are derived from polyoxyethylene or polyoxypropylene diols in which one or both of the terminal hydroxyl groups are etherified or esterified.

Preferred surfactants have the following formula:

HO—[(CH2)[i]—CH2—CH2—O][m]—R—C[n]H2n+1

HO—[(CH2)[i]—CH2—CH2—O][m]—C[n]H2n+1 wherein x and n are from 8 to 20; $R^6$ is an aryl radical having 6 to 12 carbon atoms; m is from 5 to 20; and i is 0 or 1.

The amount of raw materials which include the substituted cyclic dicarboxylic acid anhydride, colloidal stabilizer, optionally a surfactant, and water are prepared in ratios which are known to those skilled in the art of papermaking size emulsions.

In Step (II), the raw materials prepared in Step (I) which include the substituted cyclic dicarboxylic anhydride, colloidal stabilizer, and optional surfactant are added to a dispersion system.

In Step (III), the raw materials are emulsified in the dispersion system at a temperature of from 40° F. to 160° F., preferably 80° F. to 120° F. to form a paper size emulsion. Preferably, the paper size emulsion has a percent solids of 1 to 40 weight percent. More preferably, the paper size emulsion has a percent solids of 5 to 20 weight percent, most preferably 8 to 12 weight percent.

The dispersion system comprises a dispersion apparatus having a cylindrical housing which is divided into an upper chamber and a lower chamber by a partition. A cooling jacket contacts the cylindrical housing. The cooling jacket removes excess heat generated by the emulsification process and thus improves the quality of the paper size emulsion. An axially disposed shaft extension passes through the partition to turn one turbine blade in the lower chamber and a second turbine blade in the upper chamber. A distribution ring having a circumferential skirt is mounted to the end of the shaft extension and is axially aligned with a primary inlet formed in a bottom wall of the lower chamber. Fluid material or particulate matter is pumped under pressure upwardly through the primary inlet and into the skirt of the distribution ring. The liquid is forced through a plurality of radial holes in the skirt to direct the first fluid radially outwardly into pressure zones formed between "L" shaped kinetic baffles mounted in the chamber. The turbine blade imparts energy to the materials. The high input pressure forces the materials upwardly into a small annular opening between the shaft extension and baffle plate into the upper chamber. The materials are then directed outwardly by the second blade through a porous screen and through an outlet.

Referring to the drawings, FIG. 1 is a graph of a particle size distribution of an alkenyl succinic anhydridelstarch paper size emulsion after one-pass through a dispersion system according to the invention. The emulsion was prepared with NALSIZE 7542, available from Nalco Chemical Company, which is an alkenyl succinic anhydride ($C_{16}$–$C_{18}$) containing up to 2% nonionic surfactant. The NALSIZE 7542 was injected into REDISIZE 132, available from National Starch and Chemical Company, which is an aqueous solution containing 8% of a cooked or gelatinized waxy maize starch, prior to entering the dispersion system. The NALSIZE 7542 was present in an amount of 658 cc and the REDISIZE 132 was present in an amount of 3127 cc, 2 parts ASA /1 part starch respectively. After one-pass through the dispersion system, the particle size of the resulting emulsion was determined using a Horiba LA-900 Particle Size Analyzer at a relative refractive index of 1.23 to 4.13i. The test results were as follows: median diameter =0.941 ($\mu$m); specific surface are =71123 $cm^2/cm^3$; standard deviation =0.364 ($\mu$m); diameter based on percent particle size:

5.0%=0.465 $\mu$m
25.0%=0.736 $\mu$m
50.0%=0.941 $\mu$m
75.0%=1.181 $\mu$m
98.0%=1.916 $\mu$m and the percent based on diameter of 1.00 $\mu$m=57.0%. Thus, 98% of the paper size emulsion had a particle size of less than 2 microns after only one-pass through the dispersion system of the invention.

Figure 2:
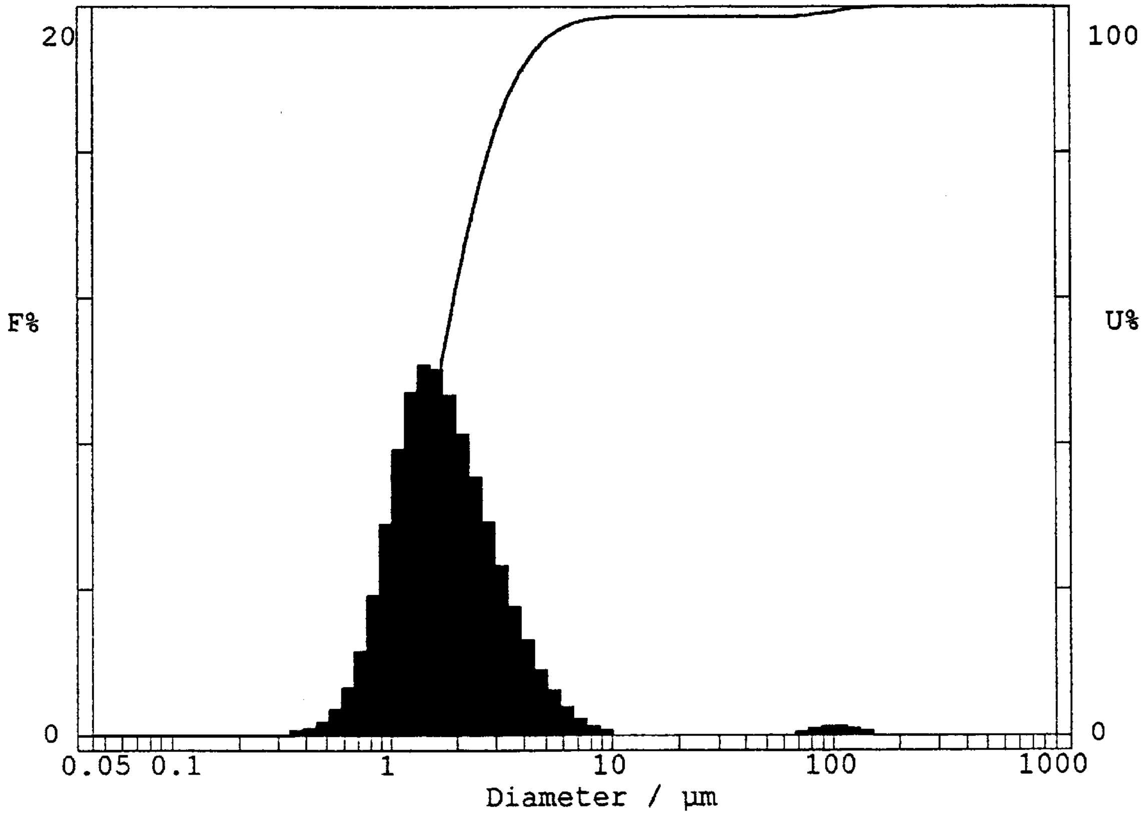
FIG. 2 is a graph of a particle size distribution of an alkenyl succinic anhydride/starch paper size emulsion after one-pass through a turbine dispersion apparatus.

Referring to the drawings, FIG. 2 is a graph of a particle size distribution of an alkenyl succinic anhydride/starch paper size emulsion after one-pass through a Burks Pump Turbine. The turbine was a 20 gallon per minute turbine which was set at 160 psi and 3500 rpm. The emulsion was prepared with NALSIZE 7542, available from Nalco Chemical Company, which is an alkenyl succinic anhydride ($C_{16}$–$C_{18}$) containing up to 2% nonionic surfactant. The NALSIZE 7542 was injected into REDISIZE 132, available from National Starch and Chemical Company, which is an aqueous solution containing 8% of a cooked or gelatinized waxy maize starch, prior to entering the turbine. The NALSIZE 7542 was present in an amount of 658 cc and the REDISIZE 132 was present in an amount of 3127 cc, 2 parts ASA /1 part starch respectively. After one-pass through the turbine, the particle size of the resulting emulsion was determined using a Horiba LA-900 Particle Size Analyzer at a relative refractive index of 1.23 to 4.13i. The test results were as follows: median diameter =1.674 (μm); specific surface are =39481 $cm^2/cm^3$; standard deviation =11.813 (μm); diameter based on percent particle size:

5.0%=0.758 μm 25.0%=1.189 μm 50.0%=1.674 μm 75.0%=2.494 μm 98.0%=7.152 μm and the percent based on diameter of 1.00 μm=14.6%. Thus, only about 60% of the paper size emulsion had a particle size of less than 2 microns after one-pass through the turbine dispersion apparatus.

Figure 3:
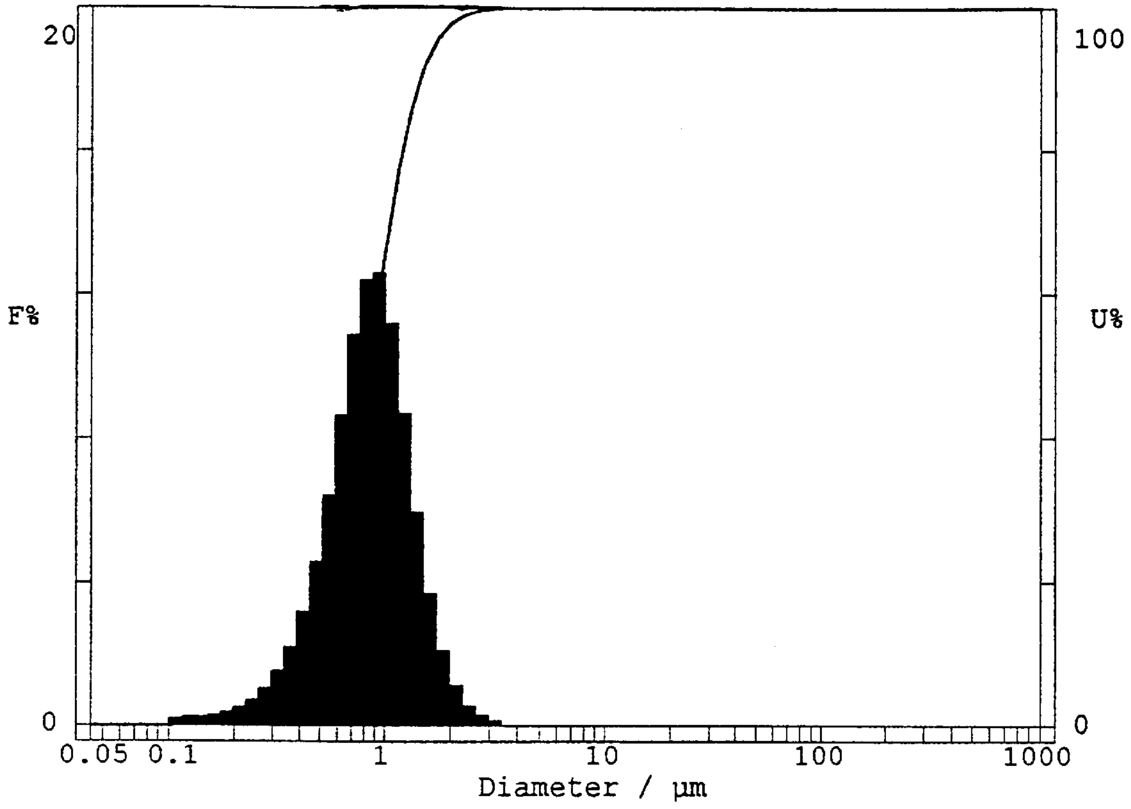
FIG. 3 is a graph of a particle size distribution of an alkenyl succinic anhydride/starch paper size emulsion after nineteen-passes through a turbine dispersion apparatus.

Referring to the drawings, FIG. 3 is a graph of a particle size distribution of an alkenyl succinic anhydridelstarch paper size emulsion after nineteen-passes through a Burks Pump Turbine. The turbine was a 20 gallon per minute turbine which was set at 160 psi and 3500 rpm. The emulsion was prepared with NALSIZE 7542, available from Nalco Chemical Company, which is an alkenyl succinic anhydride ($C_{16}$–$C_{18}$) containing up to 2% nonionic surfactant. The NALSIZE 7542 was injected into REDISIZE 132, available from National Starch and Chemical Company, which is an aqueous solution containing 8% of a cooked or gelatinized waxy maize starch, prior to entering the turbine. The NALSIZE 7542 was present in an amount of 658 cc and the REDISIZE 132 was present in an amount of 3127 cc, 2 parts ASA /1 part starch respectively. After nineteen-passes through the turbine, the particle size of the resulting emulsion was determined using a Horiba LA-900 Particle Size Analyzer at a relative refractive index of 1.23 to 4.13i. The test results were as follows: median diameter =0.843 (μm); specific surface are =85590 $cm^2/cm^3$; standard deviation =0.423 (μm); diameter based on percent particle size:

5.0%=0.331 μm 25.0%=0.615 μm 50.0%=0.843 μm 75.0%=1.118 μm 98.0%=2.016 μm and the percent based on diameter of 1.00 μm=65.7%. Thus, the turbine dispersion apparatus required nineteen-passes in order to provide 98% of the paper size emulsion with a particle size of about 2 microns or less.

As shown in FIG. 4, the dispersion system of the present invention is composed of three inputs: dilution water, a substituted cyclic dicarboxylic anhydride and a colloidal stabilizer, and possibly two outputs: the resulting emulsion and potentially the cooling water to a sewer 44 if it is not desired to reuse the cooling water 42. Each input has a strainer 2 to filter any foreign materials that could be part of the raw materials. The colloidal stabilizer pump 18 and the anhydride pump 26 ensure good delivery of the substituted cyclic dicarboxylic anhydride and colloidal stabilizer to the emulsifying chamber 30. On the colloidal stabilizer line a magnetic flow meter 24 measures the appropriate flow of colloidal stabilizer into the emulsifying chamber 30. Water for the colloidal stabilizer dilution, in this particular example, is assured by a micrometric valve 14. A static mixer 40 ensures proper mixing of the substituted cyclic dicarboxylic anhydride and colloidal stabilizer.

The flow of the substituted cyclic dicarboxylic anhydride is measured by a mag flow meter 24 before being delivered to the emulsifying chamber 30. On the water line, a solenoid valve 6 allows the water to the water regulator 8 which lowers the water pressure to eliminate any outside fluctuations on the water pressure. The water booster pump 10 increases the pressure to the desired operating range. The surge cylinder 12 also helps to smooth out water pressure fluctuations. A cooling water line 42 is fed to the cooling jacket of the emulsifying chamber 30. The cooling water exits the cooling jacket which surrounds the emulsifying chamber by means of a cooling water drain line 44. The used cooling water can be sent to the sewer or used in the dilution of the colloidal stabilizer or the dilution of the emulsion. The substituted cyclic dicarboxylic anhydride feed line 27 and colloidal stabilizer feed line 19 can meet separately at the bottom of the emulsifying chamber 30 or can come together before entering the emulsifying chamber 30.

The blades inside the emulsifying chamber 30 are connected to an electric motor 32 by means of a driving shaft. The emulsion exits the emulsifying chamber 30 through a exit line 46 which is connected to an homogenizing valve 34 high impart a certain degree of back pressure to the emulsifying chamber 30. The emulsion may be further diluted with water from a water line 48 before entering a static mixer 40. The emulsion exits the dispersion system through an emulsion discharge line 50.

The dispersion system may also be equipped with standard safety features such as pressure relief valves 38 after the colloidal stabilizer pump 18 and substituted cyclic dicarboxylic acid pump 26. Pressure gauges 4 are also placed in key areas to monitor the operating pressures. A temperature gauge 36 is located after the homogenizing valve 34 and prior to the static mixer 40 to measure the temperature of the emulsion. Vent valves 20 are also located on the substituted cyclic dicarboxylic anhydride feed line 27 and the colloidal stabilizer feed line 19 to remove any entrapped air. Drain valves 22 are located after the colloidal stabilizer pump 18 and the substituted cyclic dicarboxylic anhydride pump 26 for emptying the respective feed lines 27 and 19, if necessary. Of course, it is within the scope of the invention to use different types of pumps or control strategies.

Figure 5:
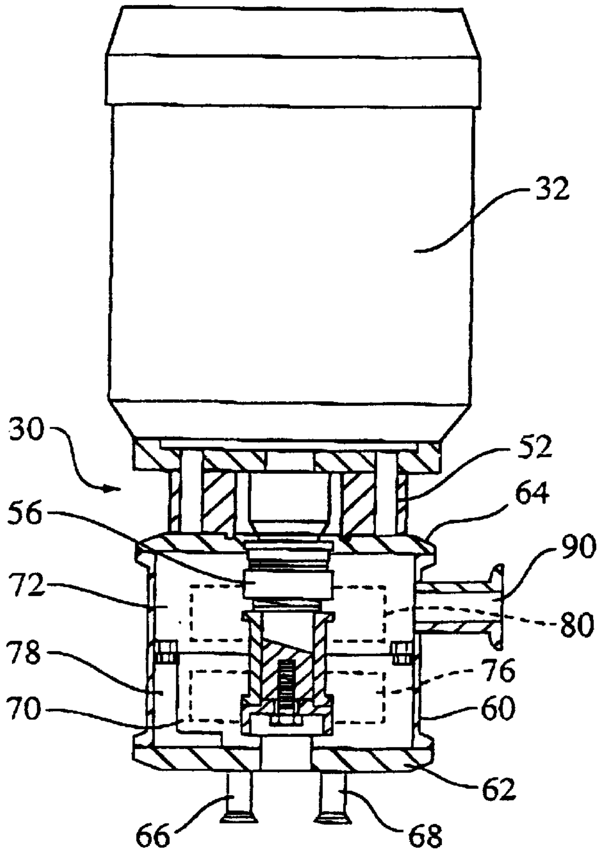
FIG. 5 is a sectional plan view of a dispersion apparatus in accordance with the dispersion system of the invention.

As shown in FIG. 5, the emulsifying chamber 30 has an electric motor 32 mounted above a two-stage mixing chamber. The electric motor 32 is mounted to a gland plate adapter 52 to support the motor 32 above the emulsifying chamber 30. The gland plate adapter 52 is satisfactory for mounting any C-face electric motor. The electric motor 32 turns a shaft 56 having a pair of blades as set forth below. The emulsifying chamber 30 includes a cylindrical body 60 closed at a lower end by an inlet plate 62 and by a gland plate 64 enclosing an upper end. A first turbine blade 76 is mounted in the lower chamber 70 on the shaft 56. A second turbine blade 80 is mounted in the upper chamber 72 on the shaft 56.

The inlet plate 62 has a first inlet port 66 for introducing the substituted cyclic dicarboxylic anhydride at high pressure upwardly into the lower chamber 70. The inlet plate 62 also has a second inlet port 68 connected to a supply of the colloidal stabilizer to be mixed with the first material from the first inlet port 66. An outlet 90 extends from the upper chamber 72 of the housing to deliver the material after it has been mixed for further processing or use.

Figure 6:
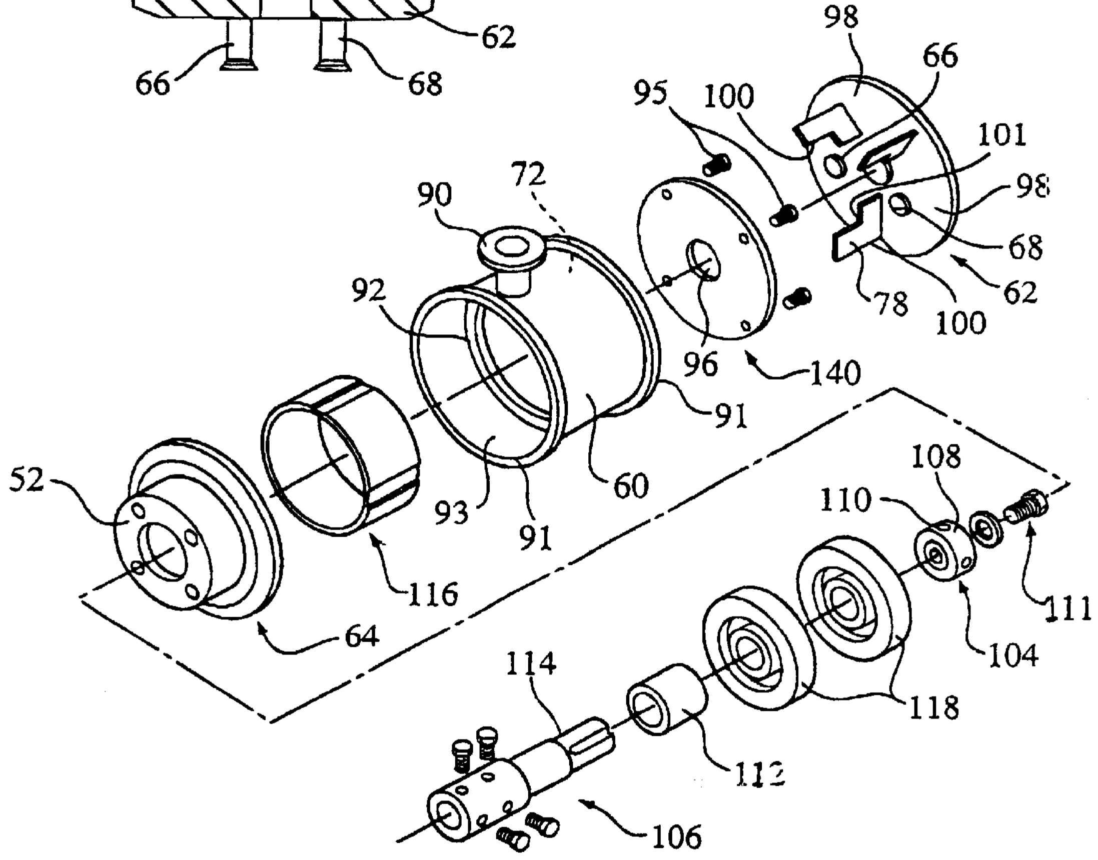
FIG. 6 is an exploded perspective view of a two-stage mixing chamber in a dispersion apparatus in accordance, with the dispersion system of the invention.

As shown in FIG. 6, the emulsifying chamber 30 having a pair of end flanges 91 for attachment of the inlet plate 62 and gland plate 64. The plates are attached to the housing by fasteners such as sanitary clamps (not shown). A baffle support ring 92 is mounted to an interior wall 93 of the cylindrical body 60 midway between the flanges 91 for mounting of a baffle plate 94 to form a first stage lower chamber 70 adjacent the inlet plate 62 and a second stage upper chamber 72. The baffle plate 94 has a center aperture 96 for receiving the shaft 56. An annular passage is formed between the center aperture 96 and the shaft 56. The clearance is approximately ½ inch. The baffle plate 94 is mounted by screws 95 or the like to the baffle support ring 92. An outlet 90 extends radially from the upper chamber 72 of the housing to deliver the emulsion after it has been mixed for further processing or use.

As shown in FIGS. 5 and 6, three L-shaped kinetic baffles 78 are mounted to the inside of the inlet plate 62 as shown in FIG. 6 to form three pressure zones 98. The L-shaped baffles 78 are disposed radially outwardly from the first inlet port 66 with a long portion extending along the internal wall 93 of the cylindrical housing 60. The baffles 78 are spaced approximately 120° apart and have interior edges 100, 101 extending at a right angle. A small aperture is formed between the interior wall 93 of the housing and the long portion of the baffles to permit fluid to pass between adjacent pressure zones 98.

As shown in FIGS. 5 and 6, a turbine blade 76 is mounted in the lower chamber 70 on the shaft 56. The blade 76 is positioned to pass near interior edges 100, 101 of the baffles 78. A distribution ring 104 is mounted to the distal end of the shaft extension 106. The ring 104 has a downwardly depending skirt 108 having lower apertures 110 extending radially through the skirt 108. The ring 104 is mounted to the shaft extension by a bolt 111.

A second turbine blade 80 is mounted within the upper chamber 72 of the housing. A spacer 112 is positioned on the shaft 106 between the turbine blade and a shoulder 114 on the shaft 106 to position a blade within the upper chamber 72. A porous screen 116 having a porosity of approximately ⅛ inch on 3⁄16 inch centers is positioned to extend between the gland plate 64 and the baffle plate 94 within the upper chamber. The screen 116 is cylindrical and has a diameter greater than the diameter of the blade 118, but less than the inner wall 92 of the housing 60 so that all material exiting the housing through the outlet 90 must pass through the screen 116.

The dispersion apparatus of the dispersion system of the invention imparts high energy to the mixture to form the emulsion. The energy is formed both by dynamic and static mechanisms. As shown in FIG. 6, the substituted cyclic dicarboxylic anhydride and colloidal stabilizer are introduced through a first inlet port 66 and a second inlet port 68 at high pressure, fix instance 150 lbs/inch, into the lower chamber 70. The mixture is received within the skirt 108 of the distribution ring 104 and is forced both under the input pressure and centrifugal force outwardly through the radial apertures 110 of the skirt 108 into the three pressure zones 98 formed between the kinetic baffles 78. The turbine blade 76 causes the mixture to rotate and to move outwardly in each of the three pressure zones 98.

The baffles 78 prevent the two materials from merely being moved as a swirling mass around the turbine blade 76. A small amount of material is permitted to rotate from pressure zone to pressure zone 98 of the lower chamber by way of the apertures in the baffles. Once directed outwardly by the turbine blade 76, the input pressure of the materials is such that it moves the combined materials upwardly through the aperture 96 in the baffle plate 94 and alongside of the shaft 56. Clearance between the shaft 56 and baffle plate 94 is preferably such that the mixture is sheared as in the static mixing. The mixture is moved into the upper chamber 72 where the a blade 80 forces the material outwardly and through the fine porous screen 116. The rotation causes dynamic mixing and the screen 116 imparts energy by way of shear as the materials move through the screen 116. The porosity of the screen 116 may be controlled and coordinated with the nature of the mixture being emulsified.

Although the apparatus is shown with two chambers, additional chambers could be formed by adding blades and baffle plates. Additionally, the chambers could be connected in series to mix in additional materials.

One-pass through the dispersion system is sufficient to form an emulsion having an average particle size of less than 2 microns, preferably about 1 micron. More preferably, at least 95%, most preferably at least 98%, of the emulsion particles after one-pass through the dispersion system have a particle size of less than 2 microns. A particle size of greater than 2 microns is undesirable because large emulsion particles may precipitate and contaminate the papermaking equipment.

The emulsion may be applied anywhere in the papermaking process where it is found to be desirable in an amount to provide the desired size concentration. However, in a preferred embodiment, the emulsion is applied to a stock furnish which is combined with cellulosic fibers at the wet end in a papermaking process. The paper size emulsions of the invention may be successfully utilized for the sizing of paper prepared from all types of both cellulosic and combinations of cellosic with non-cellulosic fibers. The hardwood or softwood cellulosic fibers which may be used include bleached and unbleached sulfate (Kraft), bleached and unbleached sulfite, bleached and unbleached soda, neutral sulfite semi-chemical, groundwood, chemi-groundwood, and any combination of these fibers. These designations refer to wood pulp fibers which have been prepared by means of a variety of processes which are used in the pulp and paper industry. In addition, synthetic cellulosic fibers of the viscose rayon or regenerated cellulose type can also be used, as well as recycled waste papers from various sources.

Paper size emulsions prepared using the one-pass, non-tolerance dependent method of the invention which are added in the papermaking process provide paper with liquid resistance Moreover, the one-pass, non-tolerance dependent method for preparing the paper size emulsion eliminates the need for repeated passes through the dispersion system in order to achieve an emulsion having the required small particle size which is a cost advantage to paper manufacturers. In addition, the dispersion system of the invention is more cost effective to manufacture due to the nontolerant equipment specifications and the lack of recirculation. Furthermore, the novel dispersion system of the invention operates at lower temperatures and pressures than prior art emulsification equipment which allows for longer equipment life. Such lower operating temperatures also provide a paper size emulsion product with improved stability which adds to the efficiency of the sizing.

While the invention has been described with particular reference to certain embodiments thereof, it will be understood that changes and modifications may be made by those of ordinary skill within the scope and spirit of the following claims.

What is claimed is:

1. A one-pass method through a non-tolerance dependent dispersion system for preparing a paper size emulsion wherein the emulsion after one-pass through a dispersion system has an average particle size of less than 2 microns, said method comprising:

(I) preparing raw materials which comprise at least one substituted cyclic dicarboxylic anhydride, at least one colloidal stabilizer, and water;

(II) adding the raw materials prepared in Step (I) to a dispersion system comprising:

a housing having a bottom chamber and an upper chamber wherein said housing has a means for cooling in contact therewith;

a motor mounted to said housing for turning a shaft extending into said housing;

a baffle plate mounted to said housing to separate said upper chamber from said lower chamber, said baffle plate having an aperture for receiving said shaft therethrough and forming an annular passage therebetween;

at least two kinetic baffles mounted within said lower chamber to form pressure zones;

an inlet cap mounted to said housing and having a primary inlet and a secondary inlet for delivering said plurality of materials into said lower chamber; and, at least two blades mounted to said shaft, at least one of said blades disposed in said lower chamber and at least one of said blades disposed in said upper chamber; and (III) emulsifying the raw materials in the dispersion system at a temperature of from about 40° F. to about 160° F. to form a paper size emulsion.

2. The method according to claim 1 wherein the substituted cyclic dicarboxylic acid anhydride is selected from the group consisting of

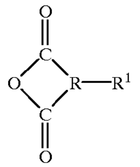

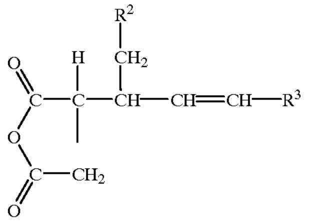

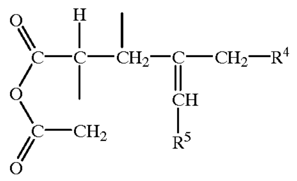

and combinations thereof, wherein R is a dimethylene or trimethylene radical; $R^1$ is a alkyl, alkenyl, aralkyl, or aralkenyl group having 6 to 23 carbon atoms; $R^2$ and $R^3$ are independently an alkyl radical having 4 to 23 carbon atoms; and $R^4$ and $R^5$ are independently an alkyl radical having 5 to 23 carbon atoms.

3. The method according to claim 2 wherein the substituted cyclic dicarboxylic acid anhydride is selected from the group consisting of iso-octadecenyl succinic acid anhydride, n- or iso-hexadecenyl succinic acid anhydride, dodecenyl succinic acid anhydride, dodecyl succinic acid anhydride, decenyl succinic acid anhydride, octenyl succinic acid anhydride, triisobutenyl succinic acid anhydride, (1-octyl-2-decenyl)-succinic acid anhydride, (1-hexyl-2-octenyl)-succinic acid anhydride, and cyclic dicarboxylic acid anhydrides prepared by the reaction of maleic acid anyhydride with vinylidene olefins selected from the group consisting of 2-n-hexyl-1-octene, 2-n-octyl-1-dodecene, 2-n-octyl-1-decene, 2-n-dodecyl-1-octene, 2-n-octyl-1-octene, 2-n-octyl-1-nonene, 2-n-hexyl-decene and 2-n-heptyl-1-octene.

4. The method according to claim 1 wherein the colloidal stabilizer is selected from the group consisting of gelatinized or cold water soluble starches or modified starches, carboxymethyl cellulose, natural gums, gelatin, cationic polymers, polyvinyl alcohol, and combinations thereof.

5. The method according to claim 4 wherein the colloidal stabilizer is a starch selected from the group consisting of corn, waxy maize, potato, tapioca and amylose starch.

6. The method according to claim 4 wherein the starch is modified by a substituent group which is selected from the group consisting of cationic, anionic, nonionic, amphoteric, zwitterionic groups, and combinations thereof.

7. The method according to claim 6 wherein the modified starch is waxy maize.

8. The one-pass method according to claim 1 further comprising a surfant in step (I).

9. The method according to claim 8 wherein the surfactant is selected from the group consisting of polyoxyethylene or polyoxypropylene alkyl and alkyl-aryl ethers or esters containing 5 to 20 polyoxyethylene or polyoxypropylene units wherein the alkyl radical contains from 8 to 20 carbon atoms and the aryl radical contains 6 to 12 carbon atoms.

10. The method according to claim 9 wherein the surfactant is selected from the group consisting of HO—[(CH2)[i]—CH2—CH2O][m]—$R^6$—C[n]H2n+1 and HO—[(CH2)[i]—CH2—CH2—O][m]—C[n]H2n+1 wherein x and n are from 8 to 20; $R^6$ is an aryl radical having 6 to 12 carbon atoms; m is from 5 to 20; and i is 0 or 1.

11. The method according to claim 1 wherein the dispersion system further comprises a cylindrical screen disposed in said upper chamber to be spaced apart and to encircle said turbine blade.

12. The method according to claim 1 wherein the dispersion system further comprises a dispersion ring mounted to an end of said shaft, said dispersion ring having a skirt having a plurality of apertures.

13. The method according to claim 1 wherein said primary inlet of said inlet plate is disposed in axial alignment with said shaft.

14. The method according to claim 1 wherein the kinetic baffles of the dispersion apparatus comprise L-shaped members disposed between said housing and said blade to form pressure zones.

15. The method according to claim 1 wherein said inlet cap of the dispersion apparatus is mounted for removal from said housing.

16. A one-pass method through a non-tolerance dependent dispersion system for preparing a paper size emulsion wherein 95% of the emulsion particles after one-pass through a dispersion system have a particle size of less than 2 microns, said method comprising:

(I) preparing raw materials which comprise at least one substituted cyclic dicarboxylic anhydride, at least one colloidal stabilizer, and water;

(II) adding the raw materials prepared in Step (I) to a dispersion system comprising:

a housing having a bottom chamber and an upper chamber wherein said housing has a means for cooling in contact therewith;

a motor mounted to said housing for turning a shaft extending into said housing;

a baffle plate mounted to said housing to separate said upper chamber from said lower chamber, said baffle plate having an aperture for receiving said shaft therethrough and forming an annular passage therebetween;

at least two kinetic baffles mounted within said lower chamber to form pressure zones;

an inlet cap mounted to said housing and having a primary inlet and a secondary inlet for delivering said plurality of materials into said lower chamber; and, at least two blades mounted to said shaft, at least one of said blades disposed in said lower chamber and at least one of said blades disposed in said upper chamber; and (III) emulsifying the raw materials in the dispersion system at a temperature of from about 40° F. to about 160° F. to form a paper size emulsion.

* * * * *